Patented Jan. 18, 1949

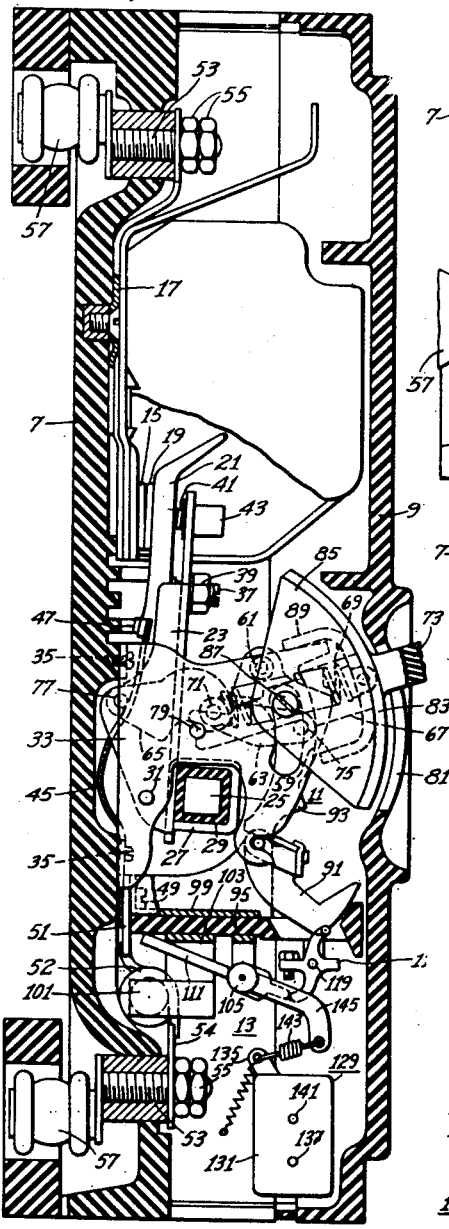
Jan. 18, 1949. J. SANDIN ET AL 2,459,588
CIRCUIT INTERRUPTER
Filed March 30, 1944
INVENTORS
Jerome Sandin, Joseph K. Kraft
and Herbert L. Rawlins.

2,459,588

UNITED STATES PATENT OFFICE 2,459,588

CIRCUIT INTERRUPTER

Jerome Sandin, Pittsburgh, Joseph K. Kraft, Wilkinsburg, and Herbert L. Rawlins, Pittsburgh, Pa., assignors to Westinghouse Electric Corporation, East Pittsburgh, Pa., a corporation of Pennsylvania Application March 30, 1944, Serial No. 528,674

25 Claims. (Cl. 200—88)

This invention relates to circuit interrupters and, more particularly, to circuit interrupters embodying electromagnetic tripping means for instantaneously tripping the interrupter in response to overload currents above a predetermined value and after a time delay on lesser overloads.

When a short circuit or fault occurs at any point in an electrical distribution system, the circuit breaker nearest to the faulted point and on the supply side should open to clear the fault condition, but no other circuit breakers should be tripped. Thus, if a fault occurs in a feeder circuit, the tripping out of the main or generator breaker should be delayed for the brief period necessary for the feeder breaker nearest the fault to clear the faulted condition which caused tripping of the feeder breaker or load breaker. It is, therefore, an object of the instant invention to provide a circuit breaker with improved means for delaying operation of the trip means for a predetermined time interval after the current exceeds a predetermined value.

Another object of the invention is to provide a circuit breaker having a thermal element operable to trip the breaker with an inverse time delay in response to overload currents below a predetermined value, electroresponsive means operable to trip the breaker in response to overload currents above said predetermined value with means for retarding for a predetermined time operation of said electroresponsive means.

Another object of the invention is to provide a circuit breaker having a bimetal element operable to trip the breaker after a time delay in response to overload currents below a predetermined value and electroresponsive means operable to trip the breaker in response to overload currents above said predetermined value with means effective upon the occurrence of an overload current above said predetermined value to retard operation of said electroresponsive means for a predetermined time.

Another object of the invention is to provide a circuit breaker according to the preceding paragraphs wherein the time delay device for retarding operation of the electroresponsive means prevents tripping of the breaker by sudden shocks but does not affect operation of the bimetallic trip means.

Another object of the invention is to provide a circuit breaker having an electromagnetic trip device with a time delay device which prevents tripping of the breaker in response to shocks or jarring forces but which permits instantaneous and time delay tripping of the breaker in response to overload currents occurring during the existence of shocks or jarring forces.

Another object of the invention is to provide a multi-pole circuit breaker having an electromagnetic trip device associated with each of at least two poles of the breaker and having a trip bar common to all of the poles of the breaker with a single time delay device connected to said trip bar in a manner to provide instantaneous and time delay tripping of the breaker but which prevents tripping operation of the trip bar in response to shocks or jarring forces.

Another object of the invention is to provide a circuit breaker according to the preceding paragraphs wherein the time delay device comprises a mechanical escapement mechanism or geared fan.

Further objects and advantages of the invention will become apparent from the following detailed description of several embodiments of the invention when read in conjunction with the accompanying drawing, in which:

Figure 1 is a vertical sectional view of a circuit breaker embodying the principles of the invention;

Fig. 2 is a vertical sectional view on an enlarged scale of the trip device;

Fig. 3 is a view taken on line III—III of Fig. 2, showing the time delay device;

Fig. 4 is a vertical sectional view on an enlarged scale of a modification of the shock-proof device;

Fig. 5 is a vertical sectional view on an enlarged scale of the trip means for the modification of the trip device shown in Fig. 4; and Fig. 6 is a view showing a time current operating curve illustrating the tripping or operating characteristics of a circuit breaker embodying the novel trip device of the invention.

Referring to Fig. 1 of the drawing, the circuit interrupter is of the three pole type and comprises a base 7 of molded insulating material, a cover 9 also of molded insulating material secured to the base by means of bolts (not shown), operating mechanism indicated generally at 11 and a trip device indicated generally at 13 having a separate electroresponsive tripping means for each of at least two of the poles of the interrupter. Each pole of the breaker is provided with a stationary contact 15 mounted on the lower end of a conductor 17 of the corresponding pole of the breaker, the conductor being suitably secured to the base 7.

The movable contact structures of the several poles are the same, for which reason only the movable contact structure for the center pole has been shown and will be described. The movable contact 19 for the center pole is secured to a contact arm 21 which is loosely supported on a channel-shaped switch arm 23. The three channel-shaped switch arms of the three poles are rigidly fastened for unitary movement by means of a metal tie bar 25 which extends transversely across all of the poles of the breaker. The tie bar 25 is fastened to the switch arms 23 adjacent the pivoted ends thereof by means of metal straps 27 looped about the tie bar and clinched thereagainst. The tie bar is surrounded by an insulating tube 29 in order to insulate and prevent short circuiting of the poles of the interrupter. By means of the tie bar 25, all of the switch arms 23 are mechanically interconnected so that all three of the switch arms are operated by a single operating mechanism, which is hereinafter described. The channel-shaped switch arm 23 for the center pole is pivotally supported on a pin 31 mounted in a U-shaped main frame 33 secured to the base 7 by means of screws 35. The pivot pin 31 forms the common pivot for the three mechanically connected switch arms 23.

Each of the contact arms 21, to which the movable contacts 19 are secured, is attached to its corresponding channel-shaped switch arm 23 by means of a headed adjusting bolt 37 which threadedly engages the switch arm and is locked in adjusted position by a lock nut 39. The head (not shown) of the bolt 37 loosely engages in a recess in the contact arm and is retained therein by an inwardly flanged portion of the contact arm. Contact pressure is provided by a compression spring 41 having one end seated in a cup-shaped spring seat 43 mounted on the switch arm 23 near its upper end and the other end bearing against the contact arm 21. The spring 41, in the open contact position of the switch arm 23, biases the contact arm 21 counterclockwise about the head of the bolt 37, the movement being limited by a tail portion of the contact arm 21 striking the channel-shaped switch arm 23.

The upper end of a flexible conductor 45 is electrically and mechanically connected to the lower end of the contact arm 21 by means of a clamp 47 and the lower end of the flexible conductor is connected by means of a screw 49 to a conductor 51 (Figs. 1 and 2). The conductor 51 is electrically connected to a coil 52 which forms the energizing means for the corresponding pole of the trip device 13. The energizing coil 52 is electrically connected to a conductor 54 which has its lower end connected by means of a bolt 53 and nuts 55 to a terminal connector 57. The upper end of the conductor 17 is similarly connected to a terminal connection 57. The circuits for the two outer poles are the same as the circuit for the center pole; consequently, only the circuit for the center pole will be traced. This circuit extends from the upper terminal 57 through the conductor 17, stationary contact 15, movable contact 19, contact arm 21, flexible conductor 45, conductor 51, the trip device energizing coil 52, conductor 54 and the bolt 53 to the terminal connector 57.

The movable contact structure comprising the channel-shaped switch arms 23, the tie bar 25 and the contact arms 21 for all three poles of the breaker, is adapted to be operated to open and closed positions to open and close the circuit of the interrupter by the single operating mechanism 11. This operating mechanism comprises a carrier or support member 59 pivotally mounted by means of a pin 61 on the main frame 33, a pair of toggle links 63 and 65 interconnecting the carrier 59 and the center pole switch arm 23, a U-shaped operating lever 67, overcenter springs 69 for connecting the operating lever 67 to the knee pivot pin 71 of the toggle links 63 and 65, and an insulating operating handle 73 for the operating lever.

The toggle link 63 is pivotally connected by means of a pin 75 to the carrier 59, while the toggle link 65 is pivotally connected by means of a pin 77 to the channel-shaped switch arm 23 for the center pole of the interrupter. The two legs of the operating lever 67 are disposed adjacent the inner sides of the main frame 33 and are pivotally supported on pins 79 projecting inwardly from the sides of the frame. The operating handle 73 projects through an opening 81 in the cover 9 and has an arcuate protective portion 83 having side portions 85 integral with the portion 83. The side portions 85 of the operating handle straddle the main frame 33 and are secured to the two legs of the operating lever 67 by means of screws 87 which threadedly engage the respective legs of the operating lever 67. The connecting portion of the operating lever is provided with a formed-over portion 89. The portion 89 of the operating lever is for the purpose of engaging and resetting the carrier 59 to its latched position by movement of the operating handle as far as it will go in opening direction, in order to reset the mechanism following a tripping operation of the interrupter. The carrier 59 is normally restrained in latched position as shown in Fig. 1 by a latch 91 of the trip device, which engages a latching portion 93 of the carrier.

The operation of the circuit interrupter operating mechanism is as follows: With the parts in the position shown in Fig. 1, in which position all of the contact means are closed and the carrier 59 is held in latched position; if the operating handle 73 is moved in a clockwise direction from the position shown to the opposite end of the slot 81, thus rotating the operating lever 67 in a clockwise direction, the overcenter spring 69 will snap overcenter below the line 71—75 and cause the toggle links 63—65 to collapse, thereby causing simultaneous movement of all of the channel-shaped switch arms 23 and the movable contacts 19 to the open-circuit position with a snap action. To reclose the interrupter, the operating handle is moved in the opposite direction back to the position shown in Fig. 1. This movement of the handle causes the overcenter springs to snap overcenter in the opposite direction and move the toggle to the in-toggle position to simultaneously close all of the contact means with a snap action.

The circuit interrupter is opened automatically in response to overload currents occurring in the circuit of any pole of the breaker, by operation of the trip device 13. When the latch 91 is released by the trip device in response to an overload current, it frees the carrier 59 and permits the springs 69 to rotate the carrier in a counterclockwise direction, thus causing collapse of the toggle 63—65 and movement of the channel-shaped switch arms and the movable contacts for all three poles of the breaker to the open circuit position. The breaker cannot be closed after a tripping operation until the handle is moved to the fully opened position in order to reset and relatch the carrier 59 with the latch 91. After the carrier has been relatched, the operating handle may then be moved to the closed circuit position to effect closing of the contacts.

The trip device comprises an insulating base or support member 95 (Figs. 1 and 2) secured to a metal angle bracket 99 which is, in turn, secured to the base 7 of the circuit breaker by means of the screws 49. The electro-responsive tripping means for the three poles of the breaker are the same, therefore only the one for the center pole will be described. The energizing coil 52 of each pole surrounds the center portion of a U-shaped magnetic core member 101 (Figs. 1 and 2) mounted on a U-shaped bracket 103 of non-magnetic material. The center portion of the bracket 103 is secured to the base 95 of the trip device, the legs of the bracket each being suitably secured to the corresponding legs of the U-shaped core member. A trip bar 105 of insulating material is pivotally supported by means of pins 107 molded into the ends thereof extending into openings in spaced brackets 109 (only one being shown) secured to the base 95 of the trip device. Securely mounted in the trip bar 105 is a plurality of armatures 111, there being an armature 111 associated with each of the magnet core members for the three poles of the breaker. Also, securely mounted on the trip bar 105 is a projection 113 which normally engages a projection 115 of a latch element 117. The latch element 117 is pivotally mounted by means of a pin 119 supported by a pair of spaced brackets 121 (only one being shown) secured to the base member 95. The other end of the latch element 117 carries a pin 123 which normally engages the latching end of the latch 91 to releasably restrain the latch member 91 in latching position.

When the core member 101 is energized in response to overload currents, the armature 111 is attracted and rotates the trip bar 105 counterclockwise (Fig. 2) moving the projection 113 out of engagement with the projection 115 on the latch element 117. As the counterclockwise movement of the armature and the trip bar continues, the projection 113 strikes the end of a screw 125 in a portion 127 integral with the latch element 117 and moves the latch element clockwise to disengage the pin 123 from the latch 91. This frees the carrier 59 and causes an opening operation of the breaker in the manner previously described.

Means comprising a single mechanical time delay device for all poles of the breaker and indicated generally at 129 (Figs. 1, 2 and 3), is provided to control the tripping of the breaker in response to overload currents below a predetermined magnitude for instance, below 1000% of rated current, the time delay being inverse to the value of the overload current. The trip device operates to trip the breaker instantaneously in response to overloads above the predetermined value. The time delay device 129 is rigidly secured to a portion of the base 7 of the breaker and comprises a pair of spaced plates 131 between which is mounted an escapement wheel 133 (Figs. 2 and 3) operated through a train of gears by means of a lever 135. The escapement wheel is mounted for rotation on a shaft 137 supported in the plates 131 and is engaged by a pallet or escapement member 139 mounted for oscillation on a shaft 141 supported in the frames 131. The lever 135 is pivotally mounted on the shaft 141 and is connected by means of an instantaneous- trip spring 143 to an arm 145 formed integral with the trip bar 105. A spring 147 having one end connected to the lever 135 and the other end anchored on a pin 149 projecting from a portion of the base 7 of the breaker biases the lever 135 against clockwise rotation. The spring 147 also acts through the lever 135 and the spring 143 to bias the arm 145, the trip bar 105 and the three armatures 111 to the normal unoperated position as shown in Figs. 1 and 2. Pivotally mounted on a screw 151 supported in the lever 135 is a pawl 153 biased by means of a spring 155 into engagement with the teeth of a gear wheel 157 mounted for rotation on the shaft 141. The gear wheel 157 meshes with a pinion 159 rigidly secured to a gear wheel 161 mounted for rotation on the shaft 137 and the gear wheel 161 meshes with a pinion 163 rigidly secured to a gear wheel 165 mounted for rotation on the shaft 141. The gear wheel 165 meshes with a pinion 167 secured to the escapement wheel 133 which is engaged by the escapement member 139. A retarding weight 169 is rigidly secured to the escapement member 139 and moves therewith to retard the oscillation of the escapement member.

In order to obtain the desired time delay with a relatively small movement of the trip bar the gear train causes several rotations of the escapement wheel 133 for a small fraction of a single rotation of the lever 135 and the gear wheel 157.

Upon the occurrence of an overload current below the predetermined value, the core member 101 is energized and attracts the armature 111. The force with which the armature is attracted in response to overloads below the predetermined value is insufficient to stretch the spring 143. The attractive force of the core member 101 is applied through the spring 143, the lever 135 and the pawl 153 to operate the gear wheel 157, and through the agency of the gear train rotates the escapement wheel 133 under the control of the escapement member 139. The magnetic pull of the electroresponsive means continues to rotate the armature and the trip bar 105 until after a predetermined time the projection 113 on the trip bar engages the end of the screw 125 and operates the latch member 117 to release the latch 91 to thereby release the carrier 59 (Fig. 1). The breaker is then operated to the open contact position in the previously described manner. As soon as the current flow is interrupted, the electroresponsive means is deenergized and the spring 147 restores the lever 135 counterclockwise, to normal position, the pawl 153 moving idly over the teeth of the gear wheel 157. The counterclockwise movement of the lever 135 acts through the spring 143 and arm 145 to rotate the trip bar 105 and the armature 111 in a clockwise direction to the normal unoperated position as shown in Figures 1 to 2. As the trip bar 105 approaches the normal position, the projection 113 thereon engages the projection 115 on the latch member 117 and restores the latch member to latching position.

Upon the occurrence of a short circuit or an overload current of a predetermined degree, such for example as 1000% or more of rated current, the magnetic force of the electroresponsive means is sufficient to overcome the tension of the spring 143 and operate the trip bar 105 to instantaneously trip the breaker.

Since there are no thermally responsive elements or heater elements to cool off, the trip device is reset immediately after the breaker has tripped open and the breaker mechanism may be immediately reset and the contacts closed.

The provision of the escapement time delay device connected to the trip bar makes the trip device shockproof since the trip bar is firmly restrained against operation in response to shocks or jarring forces due to the inertia of the gear wheels and the escapement member 139.

Figures 4 and 5 of the drawing disclose a modification of the invention wherein a mechanical escapement device is connected to the trip bar of a circuit breaker to delay operation of the electroresponsive trip device for a predetermined time after the overload current exceeds a predetermined value. According to the embodiment of the invention shown in Figs. 4 and 5, the escapement device also acts as a shockproof device to prevent tripping of the breaker in response to shocks. The time delay is inverse to the magnitude of the overload but is sufficiently long to permit tripping out of a feeder or load breaker thereby isolating the faulted line and also to take care of high transient currents caused by the starting of alternating current motors.

Referring to Figure 5 of the drawing, a trip bar 171 is pivotally supported by spaced brackets 173 secured to a trip device base 175. The base 175 is supported in the same manner as the base 95 of the trip device in the Fig. 1 modification. The trip bar 171 is biased to a normal position (Figs. 4 and 5) by means of a spring 176 and has a projection 177 which carries a latch pin 179 normally engaging the latch 91 to restrain the carrier 93 (Fig. 1) and the breaker mechanism in closed circuit position. The trip bar 171 is adapted to be operated by means of an electromagnet indicated generally at 181 (Fig. 5), on overloads above a predetermined value, and by a thermal element 197 heated in response to overload currents below the predetermined value.

The electromagnet 181 comprises a U-shaped core member 183 of magnetic material rigidly secured to the base 175 of the trip device, an energizing conductor 185 having a loop 187 extending between the legs of the U-shaped core member, and a movable armature 189. The ends of the conductor 185 are secured to the base of the breaker and electrically connected in the circuit of the breaker in the same manner that the conductors 51—54 in Figure 1 is secured. The armature 189 is movably mounted on two bolts 191 (only one being shown) supported in the base 175 of the trip device and extending through openings in the legs of the U-shaped magnet core 183 and through openings in the armature. The armature 189 is normally biased against nuts 193 on the ends of the bolts 191 by means of springs 195 compressed between spring seats in the legs of the core member and the armature.

It will be understood that three electromagnets 181 are provided, one for each of the three poles of the breaker. The trip bar 171 is common to all of the poles of the breaker and has secured thereto three arms 196 each having its free end operatively related to the armature 189 of the corresponding electromagnet 181. Upon the occurrence of an overload above a predetermined value for instance 1500 amperes or over, or a short circuit, the armature 189 associated with the affected pole is attracted and operates the trip bar 171 to trip the breaker after the predetermined time delay provided by the time delay device shown in Fig. 4.

On overloads below the predetermined value, the breaker is tripped after a time delay by means of a bi-metal element 197 (Fig. 5) which is heated in response to the current of the circuit of the breaker. There is a bimetal element 197 for each of the three poles of the breaker and each bimetal element is secured to and disposed in heating relation with the loop 187 of the corresponding conductor 185. The free end of the bimetal element is disposed adjacent the end of an adjusting screw 199 carried in an extension 201 of the trip bar 171. When the bimetal element is heated a predetermined amount in response to a persistent overload current below the predetermined value, it deflects in a direction to operate the trip lever and effect tripping of the breaker.

In order to delay tripping of the breaker by the electromagnetic means 181 for a predetermined time after the current exceeds a predetermined value, and to prevent tripping operation of the trip device shown in Figs. 4 and 5 in response to shocks, there is provided an escapement wheel 203 (Fig. 4) rotatably mounted on a pin 205 supported in the two legs of a U-shaped bracket 207. The bracket 207 is secured to the base 175 of the trip device and also supports a pin 209 upon which is mounted for oscillating movement an escapement member 211 which cooperates with the escapement wheel 203. Secured to the trip bar 171 is an arm 213 having an open slot in the free end thereof engaging a pin 215 carried by the escapement wheel 203. The arm is provided with ears 217 and 219 formed at right angles thereto for securing the arm to the trip bar. A bolt 221 passes through an opening in the ear 217 and threadedly engages the trip bar, and a relatively strong spring 223 compressed between the ear 217 and the head of the bolt 221 biases the arm 213 into contact with both edges of the trip bar. A screw 225 passes through an opening in the ear 219 and threadedly engages in an opening in the trip bar 171. There is a clearance between the head of the screw 225 and the ear 219 to permit relative movement between the trip bar and the arm 213. The screw 225 is locked in place by means of a lock nut 227.

The device described in the preceding paragraph serves as a fixed time delay device when the overload current exceeds a predetermined value, for instance, between 1500 amperes and 10000 amperes and delays operation of the electroresponsive trip means for approximately 4 cycles in order to permit isolation of the faulted line by opening of the load breaker or line breaker without causing opening of the generator breaker and interruption of the current supply to other lines.

Referring to Figure 6, which represents a time-current curve of the trip device, it will be seen that the bimetal element functions to trip the breaker with an inverse time delay between normal rated current of 225 amperes and approximately 1500 amperes. When the overload current exceeds 1500 amperes the electromagnetic trip device functions, however, between 1500 amperes and 10000 amperes the time delay device is effective to delay tripping of the breaker with a fixed time delay of approximately 4 cycles. This time interval is inverse to the magnitude of the overload current but is sufficient to permit the breaker nearest the fault to open automatically thus isolating the faulted line and permitting the current to return to normal without causing opening of the generator breaker.

When an overload current above 10000 amperes or a short circuit occurs, the electromagnet 181 functions to operate the trip bar 171 independently of the arm 213 and the time delay device to instantaneously trip the breaker. When the trip bar is operated by the electromagnet 181 it moves to tripping position relative to the arm 213 merely compressing the spring 223 without actuating the escapement device 203—211. The escapement device offers comparatively little resistance to the operation of the trip bar by the bimetal element. Upon the occurrence of a sudden shock transmitted to the trip device through the base and the breaker operating mechanism, the escapement member 211 engages and prevents rotation of the escapement wheel 203 and thereby prevents tripping operation of the trip bar.

By connecting the time delay device to the trip bar of a multi-pole circuit breaker, by means of the spring 143 (Figs. 1 and 2), a single time delay device provides time delay tripping in response to overloads occurring in any pole of the breaker and also permits instantaneous tripping in response to a short circuit, or an overload above a predetermined value occurring in any pole of the breaker. The single escapement type time delay device (Fig. 4) delays tripping by the electro-responsive means for a predetermined time depending upon the magnitude of the overload current and also prevents unwanted tripping operation of the trip bar and tripping out of the breaker in response to shocks or jarring forces. A further advantage of the invention is that the trip device is immediately reset following a tripping operation thereby permitting immediate resetting of the breaker mechanism.

Certain features disclosed but not claimed in this application are fully disclosed and claimed in copending application Serial No. 513,869, filed December 11, 1943 by Jerome Sandin and Ture Lindstrom and assigned to the assignee of the present invention.

While the invention has been disclosed in accordance with the provisions of the patent statutes, it is to be understood that various changes in the structural details thereof may be made without departing from the spirit of the invention.

We claim as our invention:

1. In a multi-pole circuit breaker, relatively movable contacts for each pole, an operating mechanism for said contacts, a trip bar common to at least two of the poles, said trip bar being operable to cause a circuit opening operation of said mechanism, electroresponsive means for each pole operable in response to predetermined circuit conditions in the corresponding pole to operate said trip bar, and a single time delay device actuated by said trip bar to prevent tripping operation of said trip bar in response to sudden shocks and to inversely retard tripping operation of said trip bar by said electroresponsive means in accordance with the magnitude of an overload occurring in any pole of the breaker.

2. In a multi-pole circuit breaker, relatively movable contacts for each pole, an operating mechanism for said contacts, a trip bar common to at least two of the poles, said trip bar being operable to cause circuit opening operation of said mechanism, an electromagnetic trip means for each pole, each of said electromagnets being operable in response to predetermined circuit conditions in the corresponding pole to operate said trip bar, a single time delay device actuated by said common trip bar for retarding operation of said trip bar by said electroresponse in response to an overload occurring in any pole of the breaker, and means for instantaneously resetting said time delay device following an operation.

3. In a multi-pole circuit breaker, relatively movable contacts for each pole, an operating mechanism for said contacts, a trip bar common to all of the poles of the breaker, said trip bar being operable to cause circuit opening operation of said mechanism, an electromagnet for each of the poles, each of said electromagnets being operable in response to overload currents occurring in the related pole to operate said trip bar, a time delay device resiliently connected to said trip bar to at all times retard tripping operation of said trip bar, and means for effecting instantaneous resetting of said time delay device.

4. In a multi-pole circuit breaker, relatively movable contacts for each pole, an operating mechanism for said contacts, a trip bar common to at least two of the poles, said trip bar being operable to cause circuit opening operation of said mechanism, electroresponsive means for each pole operable in response to abnormal circuit conditions in the related pole for operating said trip bar, a time delay device actuated by said common trip bar for inversely retarding operation of said trip bar in response to abnormal circuit conditions below a predetermined value occurring in any pole of the breaker, said time delay device preventing tripping operation of said trip bar in response to sudden shocks, and spring means connecting said time delay device to said trip bar to permit instantaneous operation of said trip bar in response to abnormal circuit conditions above said predetermined value occurring in any pole of the breaker.

5. In a multi-pole circuit breaker, relatively movable contacts for each pole, an operating mechanism for said contacts, a trip bar common to at least two of the poles, said trip bar being operable to cause circuit opening operation of said mechanism, electromagnetic means operable in response to abnormal circuit conditions occurring in any pole of the breaker to operate said trip bar, a time delay device comprising a mechanical escapement mechanism actuated by said common trip bar for at all times retarding operation of said trip bar, said time delay device acting to prevent operation of said trip bar in response to sudden shocks or jarring forces, and resetting means operable to instantaneously reset said time delay device following an operation thereof.

6. In a multi-pole circuit breaker, relatively movable contacts for each pole, an operating mechanism for said contacts, a trip bar common to at least two of the poles, said trip bar being operable to cause circuit opening operation of said mechanism, electroresponsive means operable in response to abnormal circuit conditions occurring in any pole of the breaker to operate said trip bar, and a single mechanical escapement mechanism actuated by said trip bar for at times inversely retarding operation of said trip bar in accordance to the magnitude of the overload current, said escapement mechanism being disposed and arranged to oppose operation of said trip bar in response to shocks or jarring forces but permitting operation of said trip bar in response to abnormal circuit conditions occurring during the existence of a shock.

7. In a multi-pole circuit breaker, relatively movable contacts, an operating mechanism for said contacts, a trip bar common to all of said poles, said trip bar being operable to cause circuit opening operation of said mechanism, electroresponsive means for each pole operable in response to overload current conditions occurring in the related pole to operate said trip bar, a single time delay device actuated by said common trip bar to at times inversely retard operation of said trip bar in accordance to the magnitude of the overload current, means intermediate said trip bar and said time delay device for at other times permitting instantaneous operation of said trip bar, said time delay device being constructed and arranged to at all times oppose operation of said trip bar in response to sudden shocks or jarring forces.

8. In a multi-pole circuit breaker, relatively movable contacts for each pole, an operating mechanism for said contacts, a trip bar common to a plurality of said poles, said trip bar being operable to cause circuit opening operation of said mechanism, electroresponsive means for each pole operable upon the occurrence of abnormal circuit conditions in the related pole to operate said trip bar, means at all times preventing tripping movement of said trip bar in response to jarring forces comprising a single escapement device, and spring means connecting said escapement device to said common trip bar to permit operation of said trip bar in response to abnormal circuit conditions occurring in any pole of the breaker during the existence of a jarring force.

9. In a circuit breaker comprising relatively movable contacts, operating mechanism for said contacts, restraining means normally restraining said operating mechanism in operative position and operable to cause circuit opening operation of said mechanism, means comprising an escapement device corrected to said restraining means for normally restraining said restraining means against operation in response to jarring forces, said escapement device being constructed and arranged to permit operation of said restraining means to a non-restraining position in response to abnormal circuit conditions occurring during the existence of jarring forces.

10. In a circuit breaker, relatively movable contacts, operating mechanism for said contacts, means normally restraining said operating mechanism against operation, a trip member operable to move said restraining means to non-restraining position and cause circuit opening operation of said mechanism, electroresponsive means operable in response to predetermined abnormal circuit conditions to operate said trip member, a time delay device comprising a mechanical escapement mechanism for inversely retarding movement of said restraining means to non-restraining position in response to abnormal circuit conditions below a predetermined value, spring means connecting said time delay device to said restraining means to permit instantaneous movement of said restraining means to non-restraining position in response to abnormal circuit conditions above said predetermined value, said time delay device being disposed and arranged to prevent movement of said restraining means in response to shocks or jarring forces.

11. In a circuit breaker comprising relatively movable contacts, operating mechanism for said contacts, a member operable to cause circuit opening operation of said mechanism, electroresponsive means operable in response to abnormal circuit conditions above a predetermined value to instantaneously operate said member, a bimetal element operable in response to abnormal circuit conditions below said predetermined value to operate said member after a time delay, and means comprising a mechanical escapement mechanism for restraining said member against operation in response to jarring forces, said escapement mechanism permitting operation of said member by said electroresponsive means and by said bimetal element in response to abnormal circuit conditions occurring during the existence of jarring forces, and said escapement mechanism delaying for a predetermined time operation of said member in response to abnormal circuit conditions above said predetermined value.

12. In a circuit breaker comprising relatively movable contacts, operating mechanism for said contacts, a member restraining said operating mechanism against operation and operable to cause circuit opening operation of said mechanism, electroresponsive means operable in response to abnormal circuit conditions to operate said restraining member, means comprising a mechanical escapement device operatively connected to said restraining member for preventing operation of said member in response to shocks or jarring forces, said escapement device permitting operation of said restraining member to a non-restraining position in response to abnormal circuit conditions occurring during the existence of jarring forces, and said escapement device at times retarding operation of said member.

13. In a circuit breaker comprising relatively movable contacts, operating mechanism for said contacts, means for restraining said operating mechanism against operation, trip means operable in response to abnormal circuit conditions for operating said restraining means to permit operation of said operating mechanism, and a time delay device comprising a mechanical escapement mechanism operatively connected to said restraining means for at times retarding operation of said restraining means with an inverse time delay, said time delay device being constructed and arranged to prevent operation of said restraining means in response to sudden shocks or jarring forces.

14. In a multi-pole circuit breaker comprising relatively movable contacts for each pole, an operating mechanism for said contacts, means for restraining said operating mechanism against operation, an electromagnet for each of the poles, each of said electromagnets being operable in response to overload currents occurring in the related pole to operate said restraining means to permit operation of the operating mechanism and opening of the contacts, and a time delay device resiliently connected to said restraining means to retard operation of said restraining means with an inverse time delay, said time delay device being constructed and arranged to prevent operation of the restraining means in response to shocks or jarring forces.

15. In a circuit breaker comprising relatively movable contacts, operating mechanism for said contacts, means releasably restraining said operating mechanism against operation, said restraining means being operable to release the operating mechanism and cause opening of said contacts, electroresponsive means operable in response to abnormal circuit conditions above a predetermined value to instantaneously operate said restraining means, a bimetal element operable in response to abnormal circuit conditions below said predetermined value to operate said restraining means after a time delay, and means comprising a mechanical escapement mechanism for restraining said restraining means against operation in response to jarring forces, said mechanical escapement permitting operation of said restraining means by said electroresponsive means and by said bimetal element in response to abnormal circuit conditions occurring during the existence of jarring forces, and said escapement mechanism delaying operation of said restraining means by said electroresponsive means in response to abnormal circuit conditions above said predetermined value.

16. In a multi-pole circuit breaker, relatively movable contacts for each pole, an operating mechanism for said contacts, a trip member common to at least two of the poles, said trip member being operable to cause circuit opening operation of the operating mechanism, electroresponsive means for each pole operable in response to predetermined circuit conditions in the corresponding pole to operate said trip bar, and a single time delay device connected to said common trip member to inversely retard tripping operation of said trip member by the electroresponsive means of any one of said poles for a predetermined period of time upon the occurrence of said predetermined circuit condition.

17. In a circuit breaker comprising relatively movable contacts and operating mechanism therefor, a trip member operable to cause circuit opening operation of said mechanism, electroresponsive means operable in response to abnormal circuit conditions above a predetermined value to operate said trip member, a bimetal element operable in response to abnormal circuit conditions below said predetermined value to operate said trip member with an inverse time delay, and a time delay device operatively related to said trip member to retard operation of said member by said electroresponsive means for a predetermined time following the occurrence of abnormal circuit conditions above said predetermined value.

18. In a circuit breaker comprising relatively movable contacts and operating mechanism therefor, a member operable to cause circuit opening operation of said mechanism, electroresponsive means operable in response to abnormal circuit conditions above a predetermined value to operate said member, a bimetal element operable in response to abnormal circuit conditions below said predetermined value to operate said member with an inverse time delay, a time delay device operatively related to said member to retard operation of said member by said electroresponsive means for a predetermined time following the occurrence of abnormal circuit conditions above said predetermined value, said time delay device permitting operation of said member by said bimetal element.

19. In a circuit breaker comprising relatively movable contacts and operating mechanism therefor, a member operable to cause circuit opening operation of said mechanism, electroresponsive means operable in response to abnormal circuit conditions above a predetermined value to operate said member, a bimetal element operable in response to abnormal circuit conditions below said predetermined value to operate said member with an inverse time delay, a time delay device operatively related to said member to retard operation of said member by said electroresponsive means for a predetermined time in response to transient abnormal circuit conditions above said predetermined value, said time delay device permitting operation of said member by said bimetal element, but preventing operation of said member in response to shocks or jarring forces.

20. In a multi-pole circuit breaker comprising relatively movable contacts and operating mechanism therefor, means for restraining said operating mechanism against operation, current responsive means for each pole, each of said current responsive means being responsive to overload currents below a predetermined value occurring in the related pole to operate said restraining means with an inverse time delay, electromagnetic means for each of the poles, each of said electromagnetic means being operable in response to overload currents above said predetermined value occurring in the related pole to operate said restraining means, and a time delay device operatively related to said restraining means for retarding operation of said restraining means by said electromagnetic means for a predetermined period of time following the occurrence of a transient overload current above said predetermined value in any pole of the breaker, said time delay device permitting operation of the restraining means by the current responsive means.

21. In a multi-pole circuit breaker comprising relatively movable contacts for each pole, operating mechanism therefor, a trip member common to at least two of the poles, said trip member being operable to cause circuit opening operation of said mechanism, current responsive means for each of the poles, each of said current responsive means being responsive to abnormal circuit conditions below a predetermined value in the related pole to operate said trip member with an inverse time delay, electromagnetic means for each of the poles, each of said electromagnetic means being operable in response to abnormal circuit conditions above said predetermined value in the related pole to operate said trip member, and a time delay device comprising a mechanical escapement mechanism operatively related to said trip member for inversely delaying operation of said trip member by said electromagnetic means for a predetermined time in response to transient abnormal circuit conditions above said predetermined value.

22. In a circuit breaker comprising relatively movable contacts and operating mechanism therefor, a trip member operable to cause circuit opening operation of said mechanism, a first time delay device operable in response to certain abnormal circuit conditions for operating said trip member with an inverse time delay, electroresponsive means for operating said trip member, a second time delay device related to said trip member for retarding operation of said trip member when said member is operated by said electroresponsive means in response to certain other abnormal circuit conditions, and means connecting said second time delay device to said trip member to permit said electroresponsive means at times to instantaneously trip the breaker.

23. In a circuit breaker comprising relatively movable contacts and operating mechanism therefor, a trip member operable to cause circuit opening operation of said mechanism, a first time delay device comprising current responsive means operable in response to certain abnormal circuit conditions to operate said trip member after a time delay, electroresponsive means for operating said trip member, a second time delay device comprising a mechanical escapement device related to said trip member, said second time delay device being operable in response to certain other abnormal circuit conditions to retard operation of said trip member by said electroresponsive means, and spring means connecting said second time delay device to said trip member to permit said electroresponsive means at times to instantaneously trip the breaker independently of said time delay devices.

24. In a multi-pole circuit breaker comprising relatively movable contacts for each pole and an operating mechanism therefor, a trip bar common to at least two of said poles and operable to cause circuit opening operation of said mechanism, a first time delay means comprising a time delay device for each pole operable in response to certain abnormal circuit conditions occurring in the related pole for operating said trip bar, electroresponsive means associated with each pole for operating said trip bar in response to certain other abnormal circuit conditions occurring in the related pole, a second time delay means comprising a single time delay device related to said trip bar for retarding operation of said trip bar when said trip bar is operated by the electroresponsive means for any of said poles, and means connecting said second time delay means to said trip bar to permit the electroresponsive means for any one of said poles at times to actuate said trip bar to instantaneously trip said breaker.

25. In a multi-pole circuit breaker comprising relatively movable contacts for each pole of said breaker and operating mechanism therefor, a trip bar common to at least two poles of the breaker and operable to cause circuit opening operation of said mechanism, a first time delay means comprising a bimetal element for each pole, each of said bimetal elements being operable when heated a predetermined amount in response to certain abnormal conditions occurring in the circuit of its related pole to operate the trip bar, electromagnetic means for each pole operable in response to certain other abnormal conditions occurring in the circuit of the related pole for actuating said trip bar, a mechanical escapement device related to said trip bar for retarding operation of said trip bar for a predetermined time interval when said trip bar is operated by said electromagnetic means for any pole, and spring means between said mechanical escapement device and said trip bar for permitting the electromagnetic means for any of said poles at times to operate said trip bar independently of said mechanical escapement device to instantaneously trip the breaker.

JEROME SANDIN.
JOSEPH K. KRAFT.
HERBERT L. RAWLINS.

REFERENCES CITED

The following references are of record in the file of this patent:

UNITED STATES PATENTS

| Number | Name | Date |
|---|---|---|
| 746,587 | Scott | Dec. 8, 1903 |
| 1,123,288 | Hellmund | Jan. 5, 1915 |
| 2,043,306 | Sandin | June 9, 1936 |
| 2,353,470 | Ileman | July 11, 1944 |